UNITED STATES PATENT OFFICE.

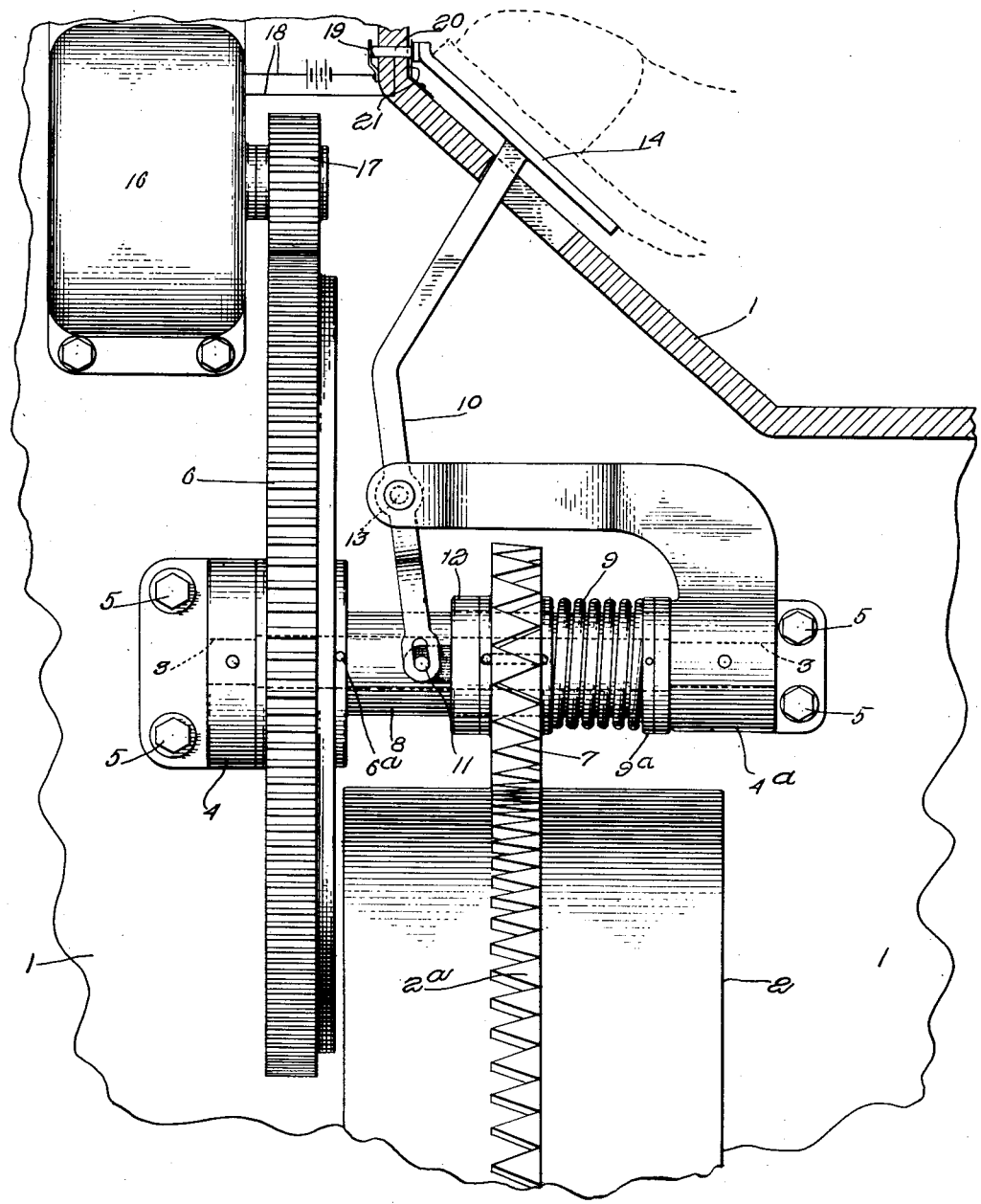

ALFRED P. FOSTER, OF EAST ORANGE, NEW JERSEY.

DEVICE FOR STARTING INTERNAL-COMBUSTION ENGINES.

1,081,731.  Specification of Letters Patent.  Patented Dec. 16, 1913.

Application filed December 22, 1910. Serial No. 598,843.

*To all whom it may concern:*

Be it known that I, ALFRED P. FOSTER, a citizen of the United States, and resident of East Orange, in the county of Essex and State of New Jersey, have invented certain new and useful Improvements in Devices for Starting Internal-Combustion Engines, of which the following is a specification.

My invention relates to a cranking device for use in starting internal combustion engines, whether employed on automobiles, boats, aeroplanes, or elsewhere and its object is to provide a device of simple construction and one that is easily and quickly operated.

The invention is illustrated by the accompanying drawing which shows a portion of a car on which is mounted the mechanism about to be described.

1 is the car. The fly wheel 2 is furnished with gear 2ª; shaft 3 is fixedly mounted in brackets 4, 4ª, fastened to the car by bolts 5; gear 6 is fastened by pin 6ª to sleeve 8 rotatably mounted on said shaft 3 and longitudinally confined thereon by said brackets 4, 4ª; gear 7 is splined to said sleeve 8, preventing rotation but permitting longitudinal motion thereon and is adapted to be forced into and out of engagement with gear 2ª; spring 9 encircles sleeve 8, being confined between the annular shoulder 9ª on said sleeve and the hub of gear 7.

The lever 10 is fulcrumed at 13 on bracket 4ª, being slotted at its lower end to engage stud 11 on collar 12 loosely mounted and longitudinally movable on sleeve 8 and abutting on the hub of gear 7; said lever 10 has its upper end in the form of a treadle 14.

The motor 16 is mounted on the car and furnished with gear 17 which engages gear 6; said motor is operated by an electric circuit including wires 18, one of which is fixed to spring contact 19 attached to the car and the other of which engages contact 20 slidingly mounted on the car, the two contacts being normally separated by spring 21 arranged on the car and engaging contact 20.

The operation of the machine is as follows: The drawing shows the starter in its operative position. Normally the starter is in its inoperative position, gear 7 being held out of engagement with gear 2ª by spring 9 and the treadle 14 being held in its uppermost position by said spring; contacts 19, 20 being separated by spring 21; the circuit being open and the motor 16 being at rest. To start the engine the operator places his foot upon treadle 14 and depresses said treadle, thereby forcing gear 7 into engagement with gear 2ª, compressing spring 9 and thereupon forcing contact 20 into engagement with contact 19, thereby closing the circuit, starting the motor and, through the gearing described, starting the fly wheel. As soon as the engine is started, the operator removes his foot from the treadle and spring 9 separates (indirectly) the contacts, opens the circuit and disengages gears 7 and 2ª, permitting the motor to come to a state of rest.

It is obvious that shaft 3, instead of being fixed to brackets 4, may be rotatably mounted thereon. Sleeve 8 could be omitted and gear 6 fixed on said shaft 3 (if rotatable as just suggested) and gear 7 splined thereto. It is equally obvious that a manually operated lever may be substituted for the lever shown. It is apparent also that gears 6 and 17 may be omitted and other means employed for operatively connecting the motor with sleeve 8, or shaft 3 if the modification suggested be employed. Gear 2ª, instead of being on fly wheel 2, might be fixed on the fly wheel shaft.

I do not limit my invention in any way by the arrangement shown which may be varied to meet differing conditions in differing situations.

One advantage of the device is that it is small and may be compactly made so as to occupy very little room.

Having described my invention, what I claim and desire to secure by Letters Patent is:—

1. A starting device for internal combustion engines including in combination a fly wheel; a gear attached thereto; a shaft; a gear thereon, rotatable therewith and movable therealong into engagement with the fly wheel gear; a gear fixed to the shaft; a motor operatively connected with the last mentioned gear; an electric circuit normally open and including normally separated contacts and adapted, when closed, to energize the motor; a spring separating the contacts; a collar loosely mounted on the shaft; a counteracting spring mounted on the shaft; a lever under the control of the operator engaging the collar and adapted therethrough to force the movable gear into engagement with the fly wheel gear, thereby compressing the last mentioned spring, and thereupon force the contacts together, thereby closing the circuit and compressing the first mentioned spring.

2. A starting device for internal combustion engines including in combination a fly wheel and a motor normally operatively disconnected; an electric circuit normally open and adapted, when closed, to energize the motor; means under the control of the operator for operatively connecting the fly wheel and motor and thereupon closing the circuit; and automatic means for opening the circuit and thereupon operatively disconnecting the fly wheel and motor.

3. In a starting device for internal combustion engines, a shaft; a gear thereon, rotatable therewith and movable therealong; a gear fixed to the shaft; a motor operatively connected with the last mentioned gear; an electric circuit normally open and including normally separated contacts and adapted, when closed, to energize the motor; a spring separating the contacts; a collar loosely mounted on the shaft; a counteracting spring mounted on the shaft; a lever under the control of the operator engaging said collar and adapted therethrough to force the movable gear along the shaft, thereby compressing the last mentioned spring, and thereupon force the contacts together, thereby closing the circuit and compressing the first mentioned spring.

4. In a starting device for internal combustion engines, a shaft; a gear mounted thereon, rotatable therewith and movable therealong; a gear fixed to the shaft; a motor operatively connected with the last mentioned gear; an electric circuit normally open and adapted, when closed, to energize the motor; means under the control of the operator for forcing the movable gear along the shaft and thereupon closing the circuit; and automatic means for opening the circuit and thereupon returning the movable gear to its original position.

5. A starting device for internal combustion engines including in combination an engine and a motor normally operatively disconnected; an electric circuit normally open and adapted, when closed, to energize the motor; means under the control of the operator for operatively connecting the motor with the engine and thereupon closing the circuit and automatic means for opening the circuit and thereupon operatively disconnecting the motor and engine.

6. In a starting device for internal combustion engines a motor; mechanism connected therewith and operated thereby and including a movable member adapted to be operatively connected with an engine; an electric circuit normally open and adapted, when closed, to energize the motor; means under the control of the operator for operatively connecting the movable member of the mechanism with an engine and thereupon closing the circuit and automatic means for opening the circuit and thereupon operatively disconnecting the movable member of the mechanism from an engine.

7. A starting device for internal combustion engines including in combination an engine and a motor normally operatively disconnected; means under the control of the operator for operatively connecting the motor with the engine and thereupon energizing the motor and automatic means for deenergizing the motor and thereupon operatively disconnecting the motor and engine.

In testimony whereof I have affixed my signature, in presence of two witnesses.

ALFRED P. FOSTER.

Witnesses:
DANIEL PRITCHARD,
TALLMADGE W. FOSTER.